US011252768B2

United States Patent
Tsuji et al.

(10) Patent No.: US 11,252,768 B2
(45) Date of Patent: Feb. 15, 2022

(54) NON-TRANSITORY COMPUTER-READABLE RECORDING MEDIUM STORING COMPUTER-READABLE INSTRUCTIONS FOR TERMINAL DEVICE AND COMMUNICATION DEVICE

(71) Applicant: BROTHER KOGYO KABUSHIKI KAISHA, Nagoya (JP)

(72) Inventors: Ryoya Tsuji, Nagoya (JP); Kazuaki Ogawa, Ichinomiya (JP); Longlong Ruan, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/036,497

(22) Filed: Sep. 29, 2020

(65) Prior Publication Data
US 2021/0100045 A1     Apr. 1, 2021

(30) Foreign Application Priority Data
Sep. 30, 2019   (JP) .............................. JP2019-179278

(51) Int. Cl.
*H04W 76/11*    (2018.01)
*H04W 12/06*    (2021.01)
*H04W 84/12*    (2009.01)

(52) U.S. Cl.
CPC ............ *H04W 76/11* (2018.02); *H04W 12/06* (2013.01); *H04W 84/12* (2013.01)

(58) Field of Classification Search
CPC ....................... H04W 72/0453; H04L 2209/80
USPC ......................................... 370/259, 329, 252
See application file for complete search history.

(56) References Cited

U.S. PATENT DOCUMENTS

| 2012/0106496 | A1* | 5/2012 | Sakai | .................... | H04W 28/18 |
|---|---|---|---|---|---|
| | | | | | 370/329 |
| 2014/0362841 | A1 | 12/2014 | Shibata | | |
| 2017/0005876 | A1 | 1/2017 | Shibata | | |
| 2018/0192291 | A1 | 7/2018 | Shibata | | |
| 2018/0352493 | A1* | 12/2018 | Strater | ................. | H04W 36/30 |
| 2019/0364566 | A1* | 11/2019 | Husted | ................. | H04W 24/08 |

FOREIGN PATENT DOCUMENTS

JP      2014-241487 A      12/2014
JP      2017-017601 A      1/2017

* cited by examiner

*Primary Examiner* — Kiet M Doan
(74) *Attorney, Agent, or Firm* — Scully, Scott, Murphy & Presser, PC

(57) ABSTRACT

A terminal device may acquire a first identifier identifying a first AP from an OS program in a case where a first wireless connection has been established with the first AP, send a search instruction to a communication device using a second wireless connection in a case where the second wireless connection is established with the communication device, receive search result information including N identifiers identifying N access points from the communication device, and determine whether the first identifier exists in the N identifiers. The terminal device may send a first connection instruction including the first identifier to the communication device in a case where it is determined that the first identifier exists, and send a second connection instruction including a second identifier to the communication device in a case where it is determined that the first identifier does not exist.

11 Claims, 10 Drawing Sheets

(Second Embodiment: Case D)

NON-TRANSITORY COMPUTER-READABLE RECORDING MEDIUM STORING COMPUTER-READABLE INSTRUCTIONS FOR TERMINAL DEVICE AND COMMUNICATION DEVICE

CROSS-REFERENCE TO RELATED APPLICATION

This application claims priority to Japanese Patent Application No. 2019-179278, filed on Sep. 30, 2019, the entire contents of which are incorporated herein by reference.

TECHNICAL FIELD

The disclosure herein discloses art for establishing a wireless connection between a communication device and an access point by using a terminal device.

BACKGROUND

A system comprising a printer, an access point (hereinbelow termed "AP"), and a terminal device is known. When a setting application is activated in a state where the terminal device has a normal AP connection established with the AP, the terminal device disconnects the normal AP connection with the AP and establishes a SoftAP connection with the printer. Then, the terminal device sends an SSID and a password of the AP to the printer by using the SoftAP connection with the printer. The printer uses the SSID and the password of the AP received from the terminal device to establish a normal AP connection with the AP.

SUMMARY

In the above technique, no consideration is given to a possibility that the printer may not be able to establish the normal AP connection with the AP using the SSID and the password of the AP received from the terminal device.

The disclosure herein provides art that is able to increase a possibility of establishing a wireless connection between a communication device and an access point.

A non-transitory computer-readable recording medium storing computer-readable instructions for a terminal device is disclosed herein. The terminal device may comprise a wireless interface configured to execute wireless communication according to Wi-Fi standard; and a processor. The computer-readable instructions, when executed by the processor, may cause the terminal device to: in a case where a first wireless connection has been established between the terminal device and a first access point via the wireless interface, acquire a first identifier identifying the first access point from an Operating System (OS) program of the terminal device, in a case where a second wireless connection is established between the terminal device and a communication device via the wireless interface, send a search instruction to the communication device via the wireless interface using the second wireless connection, the search instruction being for causing the communication device to execute a search for an access point existing around the communication device; in a case where the search is executed by the communication device in response to the search instruction having been sent to the communication device, receive search result information from the communication device via the wireless interface using the second wireless connection, the search result information including N identifiers identifying N access points (N being an integer of 1 or greater) found by the search; determine whether the first identifier exists in the N identifiers included in the search result information; in a case where it is determined that the first identifier exists in the N identifiers, send a first connection instruction including the first identifier to the communication device via the wireless interface using the second wireless connection, the first connection instruction being for establishing a wireless connection between the communication device and the first access point identified by the first identifier; and in a case where it is determined that the first identifier does not exist in the N identifiers, send a second connection instruction including a second identifier different from the first identifier to the communication device via the wireless interface using the second wireless connection, the second connection instruction being for establishing a wireless connection between the communication device and a second access point identified by the second identifier.

A communication device is also disclosed herein. The communication device may comprise: a wireless interface configured to execute wireless communication according to Wi-Fi standard; a processor; and a memory storing computer-readable instructions therein, wherein the computer-readable instructions, when executed by the processor, cause the communication device to: after a first wireless connection has been established between a terminal device and a first access point identified by a first identifier, establish a second wireless connection between the terminal device and the communication device via the wireless interface; in a case where the second wireless connection has been established, receive a search instruction from the terminal device via the wireless interface using the second wireless connection, the search instruction being for causing the communication device to execute a search for an access point existing around the communication device; execute the search via the wireless interface in response to the search instruction having been received from the terminal device; in a case where the search is executed, send search result information to the terminal device via the wireless interface using the second wireless connection, the search result information including N identifiers identifying N access points (N being an integer of 1 or greater) found by the search; in a case where the first identifier exists in the N identifiers included the search result information, receive a first connection instruction including the first identifier from the terminal device via the wireless interface using the second wireless connection; in a case where the first connection instruction is received from the terminal device, establish a wireless connection between the communication device and the first access point identified by the first identifier via the wireless interface; in a case where the first identifier does not exist in the N identifiers included the search result information, receive a second connection instruction including a second identifier different from the first identifier from the terminal device via the wireless interface using the second wireless connection; and in a case where the second connection instruction is received from the terminal device, establish a wireless connection between the communication device and a second access point identified by the second identifier via the wireless interface.

The above terminal device itself and a method executed by the terminal device are also novel and useful. A non-transitory computer-readable recording medium storing a computer program for the above communication device, and a method executed by the communication device are also novel and useful. Further, a communication system comprising the terminal device and the communication device is also novel and useful.

DETAILED DESCRIPTION

Figure 1:
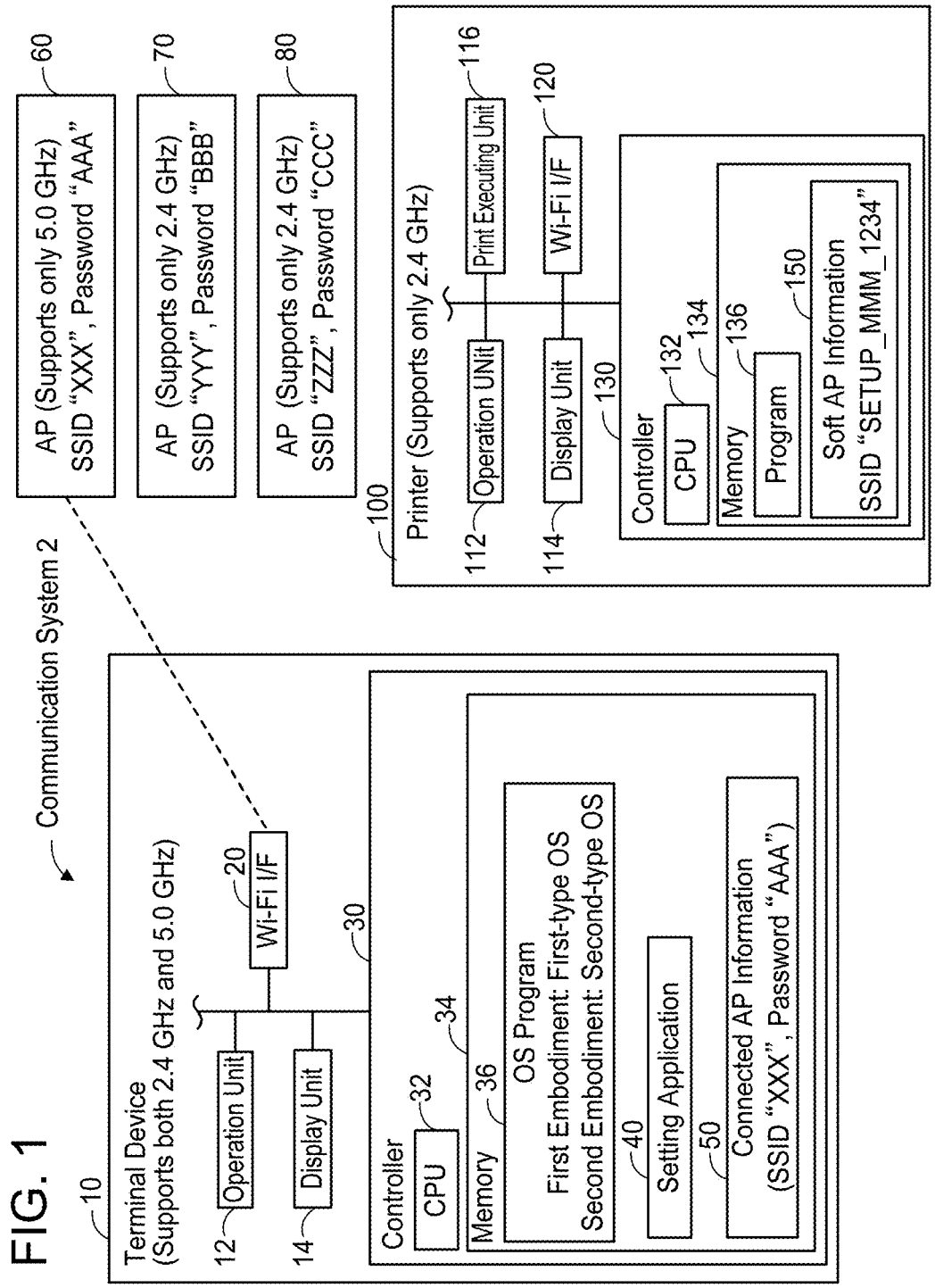
FIG. 1 shows a configuration of a communication system.

First Embodiment (Configuration of Communication System 2: FIG. 1) As shown in FIG. 1, a communication system 2 is provided with a terminal device 10, a plurality of access points (hereinbelow simply termed "APs") 60, 70, 80, and a printer 100. The present embodiment assumes a situation in which a wireless connection according to Wi-Fi standard (hereinbelow termed "Wi-Fi connection") is to be established between the printer 100 and one of the APs (such as 60) by using the terminal device 10.

(Configuration of Terminal Device 10)

The terminal device 10 is a portable terminal device such as a smartphone, a PDA, and a tablet PC. The terminal device 10 is provided with an operation unit 12, a display unit 14, a Wi-Fi interface 20, and a controller 30. The respective units 12 to 30 are connected to a bus line (reference sign omitted).

The operation unit 12 is provided with a plurality of keys. A user can input various instructions to the terminal device 10 by operating the operation unit 12. The display unit 14 is a display configured to display various types of information. The display unit 14 also functions as a touch screen configured to accept instructions from the user (i.e., as an operation unit).

The Wi-Fi interface 20 is a wireless interface configured to execute Wi-Fi communication according to the Wi-Fi standard. The Wi-Fi standard is a wireless communication standard for executing wireless communication according to the 802.11 standard and standards complying therewith (e.g., 802.11a, 11b, 11g, 11n) of the Institute of Electrical and Electronics Engineers, Inc. (IEEE), for example. The Wi-Fi interface 20 especially supports both a 2.4 GHz band and a 5.0 GHz band. That is, the terminal device 10 is configured to be capable of executing both Wi-Fi communication according to the 2.4 GHz band and Wi-Fi communication according to the 5.0 GHz band.

The controller 30 is provided with a CPU 32 and a memory 34. The CPU 32 is configured to execute various processes according to programs 36, 40 stored in the memory 34. The memory 34 is configured of a volatile memory, a nonvolatile memory, and the like, and stores the Operating System (OS) program 36, the setting application 40, and connected AP information 50. Hereinbelow, the OS program 36 and the setting application 40 are respectively termed "OS 36" and "application 40".

The OS 36 is a program for controlling basic operations of the terminal device 10, and is an iOS (registered trademark), an android (registered trademark), or the like, for example. In the present embodiment, the OS 36 is a first type of OS. The application 40 is installed to the terminal device 10 from a server on the Internet provided by a vendor of the printer 100. The application 40 is a program for establishing a Wi-Fi connection between the printer 100 and one of the APs and causing the printer 100 to execute printing via the AP.

The connected AP information 50 is information related to an AP with which the terminal device 10 has a Wi-Fi connection established. The connected AP information 50 includes a Service Set Identifier (SSID) identifying a wireless network in which the AP operates as a parent station (in other words, an SSID identifying the AP) and a password used for authentication and encryption in the wireless network. In the example of FIG. 1, the terminal device 10 is having a Wi-Fi connection established with the AP 60. Due to this, the connected AP information 50 includes an SSID "XXX" and a password "AAA" corresponding to the AP 60.

(Configurations of APs 60 to 80)

The AP 60 supports only the 5.0 GHz band. The AP 60 operates as a parent station in a wireless network identified by the SSID "XXX". In this wireless network, the password "AAA" is used. The AP 70 and the AP 80 each support only the 2.4 GHz band. The AP 70 operates as a parent station in a wireless network identified by an SSID "YYY". In this wireless network, a password "BBB" is used. The AP 80 operates as a parent station in a wireless network identified by an SSID "ZZZ". In this wireless network, a password "CCC" is used.

(Configuration of Printer 100)

The printer 100 is a peripheral device (such as a peripheral device of the terminal device 10) configured to be capable of executing a print function. The printer 100 comprises an operation unit 112, a display unit 114, a print executing unit 116, a Wi-Fi interface 120, and a controller 130.

The operation unit 112 is provided with a plurality of keys. The user can input various instructions to the printer 100 by operating the operation unit 112. The display unit 114 is a display configured to display various types of information. The display unit 114 also functions as a touch screen configured to accept instructions from the user (i.e., as an operation unit). The print executing unit 116 is provided with a print mechanism of an inkjet scheme, laser scheme, or the like, for example.

The Wi-Fi interface 120 is similar to the Wi-Fi interface 20 of the terminal device 10. However, the Wi-Fi interface 120 supports only the 2.4 GHz band. Further, the Wi-Fi interface 120 supports a SoftAP scheme. The SoftAP scheme is a communication scheme for operating as a pseudo AP (i.e., a SoftAP). A state in which the SoftAP is activated is a state in which the printer 100 operates as a parent station of a wireless network.

The controller 130 is provided with a CPU 132 and a memory 134. The CPU 132 is configured to execute various processes according to a program 136 stored in the memory 134. The memory 134 is configured of a volatile memory, a nonvolatile memory, and the like. Further, the memory 134 had stored SoftAP information 150 by the time the printer 100 was shipped.

The SoftAP information 150 is information related to the wireless network in which the printer 100 operates as a SoftAP. More specifically, the SoftAP information 150 includes an SSID "SETUP_MMM_1234" identifying the wireless network. This SSID includes a character string "SETUP" indicating a setup function, a model name "MMM" of the printer 100, and a unique character string "1234" (such as a MAC address, a product ID, etc.) identifying the printer 100. The setup function is a function for establishing a Wi-Fi connection between the printer 100 and an AP by using the terminal device 10. No password is used in the wireless network in which the printer 100 operates as the SoftAP. Due to this, the SoftAP information 150 does not include a password.

Figure 2:
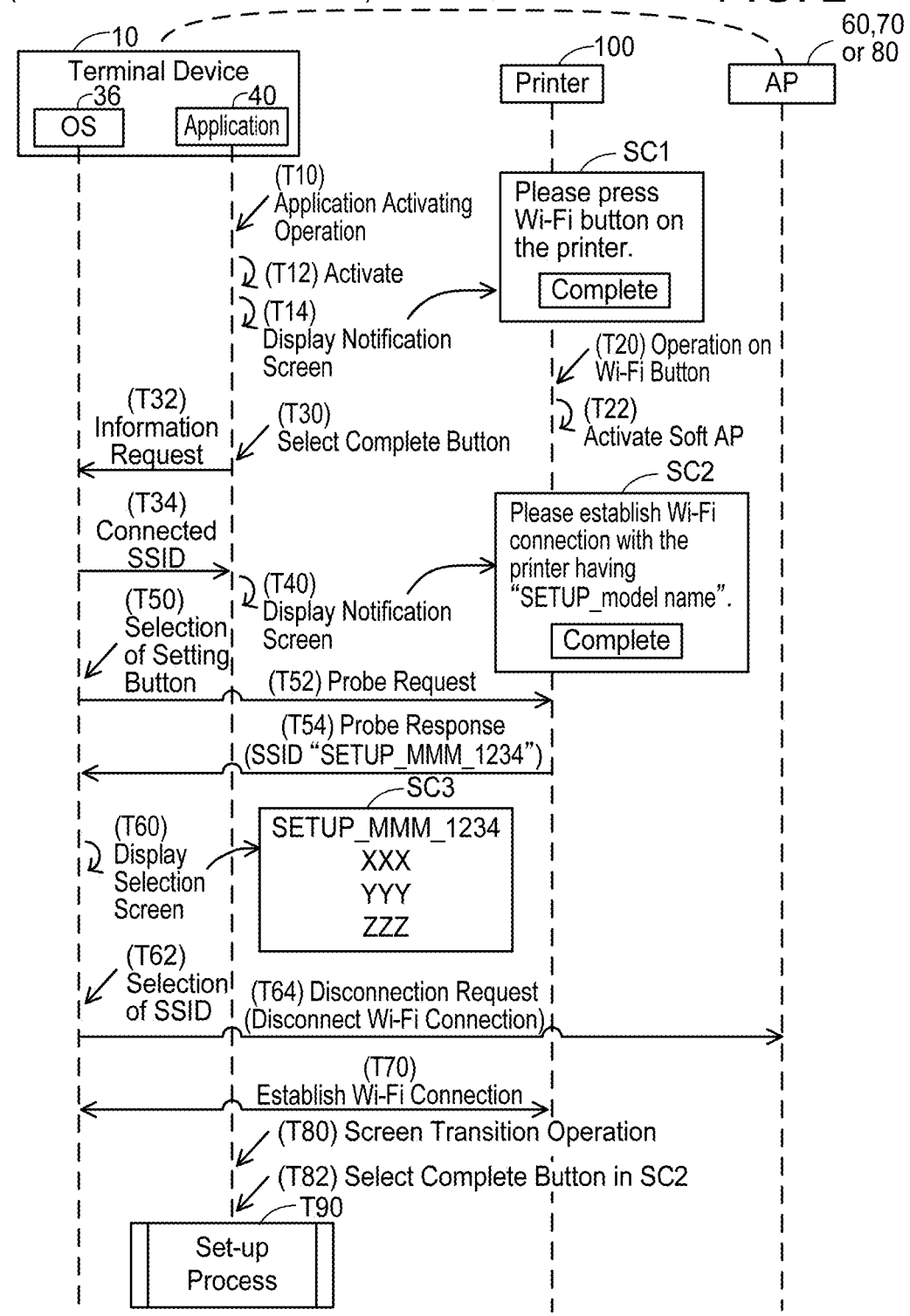
FIG. 2 shows a sequence diagram of processes executed by respective devices.

(Processes Executed by Respective Devices 10, 60 to 80, and 100: FIG. 2)

Next, processes executed by the respective devices 10, 60 to 80, and 100 for realizing the setup function will be described with reference to FIG. 2. In an initial state of a case of FIG. 2, a Wi-Fi connection has been established (a Wi-Fi connection is present) between the terminal device 10 and one of the APs 60 to 80. Hereinbelow, an AP with which the terminal device 10 has a Wi-Fi connection established will be termed "connected AP".

Hereinbelow, for explanation of processes which the CPU 32 of the terminal device 10 executes according to the OS 36, the OS 36 will be described as a subject of action rather than the CPU 32 as the subject of action. Similarly, for explanation of processes which the CPU 32 executes according to the application 40, the application 40 will be described as a subject of action. Further, for explanation of processes which the CPU 132 of the printer 100 executes, the printer 100 will be described as a subject of action rather than the CPU 132 as the subject of action. Further, every communication executed by the terminal device 10 and the printer 100 is executed via the Wi-Fi interfaces 20, 120. Due to this, the description hereinbelow omits phrase "via the Wi-Fi interface 20 (or 120)".

When a button corresponding to the application 40 is selected in T10 by the user from among a plurality of buttons (i.e., icons) displayed by the OS 36, the application 40 is activated in T12. In this case, in T14, the application 40 causes the display unit 14 to display a notification screen SC1. The notification screen SC1 includes a message prompting the user to operate a Wi-Fi button of the printer and a Complete button.

The user can acknowledge by looking at the notification screen SC1 that the user should operate the Wi-Fi button of the printer 100. Then, in T20, the user operates the Wi-Fi button of the printer 100. In this case, in T22, the printer 100 shifts from a state where the printer 100 does not activate the SoftAP to a state where the printer 100 activates the SoftAP. That is, the printer 100 operates as the parent station of the wireless network identified by the SSID "SETUP_MMM_1234". As such, since the printer 100 operates as the parent station of the wireless network, the printer 100 can suitably establish a Wi-Fi connection with the terminal device 10 in a later process (see T70).

Next, in T30, the Complete button in the notification screen SC1 is operated by the user. In this case, in T32, the application 40 supplies an information request to the OS 36. The information request is a command that requests information related to the connected AP.

When obtaining the information request from the application 40 in T32, the OS 36 obtains the SSID included in the connected AP information (hereinbelow termed "connected SSID") in the memory 34 and supplies the connected SSID to the application 40 in T34. In supplying the connected SSID, the OS 36 does not supply the password included in the connected AP information to the application 40.

When obtaining the connected SSID from the OS 36 in T34, the application 40 causes the display unit 14 to display a notification screen SC2 in T40. The notification screen SC2 includes a Complete button and a message prompting the user to establish a Wi-Fi connection between the terminal device 10 and a desired printer. Specifically, this message indicates that a Wi-Fi connection should be established with a printer corresponding to an SSID including the character string "SETUP" and the model name of the desired printer.

The user can acknowledge by looking at the notification screen SC2 that the user should establish a Wi-Fi connection between the terminal device 10 and the printer 100.

Then, in T50, the user operates a setting button for executing setting related to establishment of Wi-Fi connection from among a plurality of buttons (i.e., icons) displayed by the OS 36. In this case, in T52, the OS 36 sends a Probe request by broadcast. Here, since the terminal device 10 supports both the 2.4 GHz band and the 5.0 GHz band, the terminal 10 sends the Probe request using the 2.4 GHz band and also sends the Probe request using the 5.0 GHz band.

The printer 100 supports only the 2.4 GHz band. Due to this, the printer 100 receives the Probe request using the 2.4 GHz band from the terminal device 10 in T52. In this case, in T54, the printer 100 sends a Probe response including its own SSID "SETUP_MMM_1234" of the printer 100 operating as the SoftAP to the terminal device 10. Further, when receiving the Probe request from the terminal device 10, each of the APs 60 to 80 sends a Probe response including its own SSID (e.g., "AAA") to the terminal device 10 (this process omitted from the drawing). Specifically, the AP 60 supporting the 5.0 GHz band sends the Probe response to the terminal device 10 in response to receiving the Probe request using the 5.0 GHz band. Further, each of the APs 70, 80 supporting the 2.4 GHz band sends the Probe response to the terminal device 10 in response to receiving the Probe request using the 2.4 GHz band.

When receiving the Probe responses from the printer 100 and the respective APs 60 to 80 in T54, the OS 36 displays causes the display unit to display a selection screen SC3 including the SSIDs included in the respective received Probe responses in T60.

Since the user has looked at the aforementioned notification screen SC2 (see T40), the user acknowledges that the SSID including the character string "SETUP" and the model name "MMM" of the printer 100 should be selected in the selection screen SC3. Due to this, in T62, the user selects the SSID "SETUP_MMM_1234" of the printer 100 included in the selection screen SC3. In this case, in T64, the OS 36 sends a disconnection request requesting disconnection of the Wi-Fi connection to the connected AP. Thus, the Wi-Fi connection between the terminal device 10 and the connected AP is disconnected. A reason why the Wi-Fi connection is disconnected is as follows. That is, the terminal device 10 cannot further establish a Wi-Fi connection with the printer 100 while the Wi-Fi connection with the connected AP is being established. Due to this, the terminal device 10 disconnects the Wi-Fi connection with the connected AP, and thereafter executes a process for establishing a Wi-Fi connection with the printer 100.

Next, in T70, the OS 36 establishes a Wi-Fi connection with the printer 100 by using the SSID of the printer 100 selected in T62. Specifically, the OS 36 re-sends a Probe request by broadcast and receives a Probe response including the SSID of the printer 100 from the printer 100. By doing so, the OS 36 can identify that a target with which a Wi-Fi connection is to be established is the sender of this Probe response (i.e., the printer 100). Then, the OS 36 executes various types of communication such as Authentication, Association, and 4-Way Handshake with the printer 100. Thus, a Wi-Fi connection (hereinbelow termed "SoftAP connection") is established between the terminal device 10 and the printer 100. As aforementioned, no password is used in the wireless network in which the printer 100 operates as the SoftAP. Due to this, the OS 36 can establish the SoftAP connection with the printer 100 without requesting the user to input a password. In the wireless network in which the printer 100 operates as the SoftAP, the terminal device 10 operates as a child station (i.e., a so-called legacy). In below-described communication using the SoftAP connection, Hyper Text Transfer Protocol Secure (HTTPS) using Secure Socket Layer (SSL) is used. Thus, secure communication can be realized even in the wireless network in which no password is used.

When the SoftAP connection has been established in T70, the OS 36 causes the display unit 14 to display a screen indicating this establishment (not shown). The user can acknowledge that the SoftAP connection has been established by looking at this screen. In this case, the user performs an operation for causing a screen of the application 40 to be displayed instead of the screen of the OS 36 (e.g., operates the button corresponding to the application 40) in T80. Thus, the notification screen SC2 displayed in T40 is displayed again, and the Complete button in the notification screen SC2 is operated by the user in T82. In this case, the application 40 executes a setup process (see FIG. 3) in T90.

Figure 3:
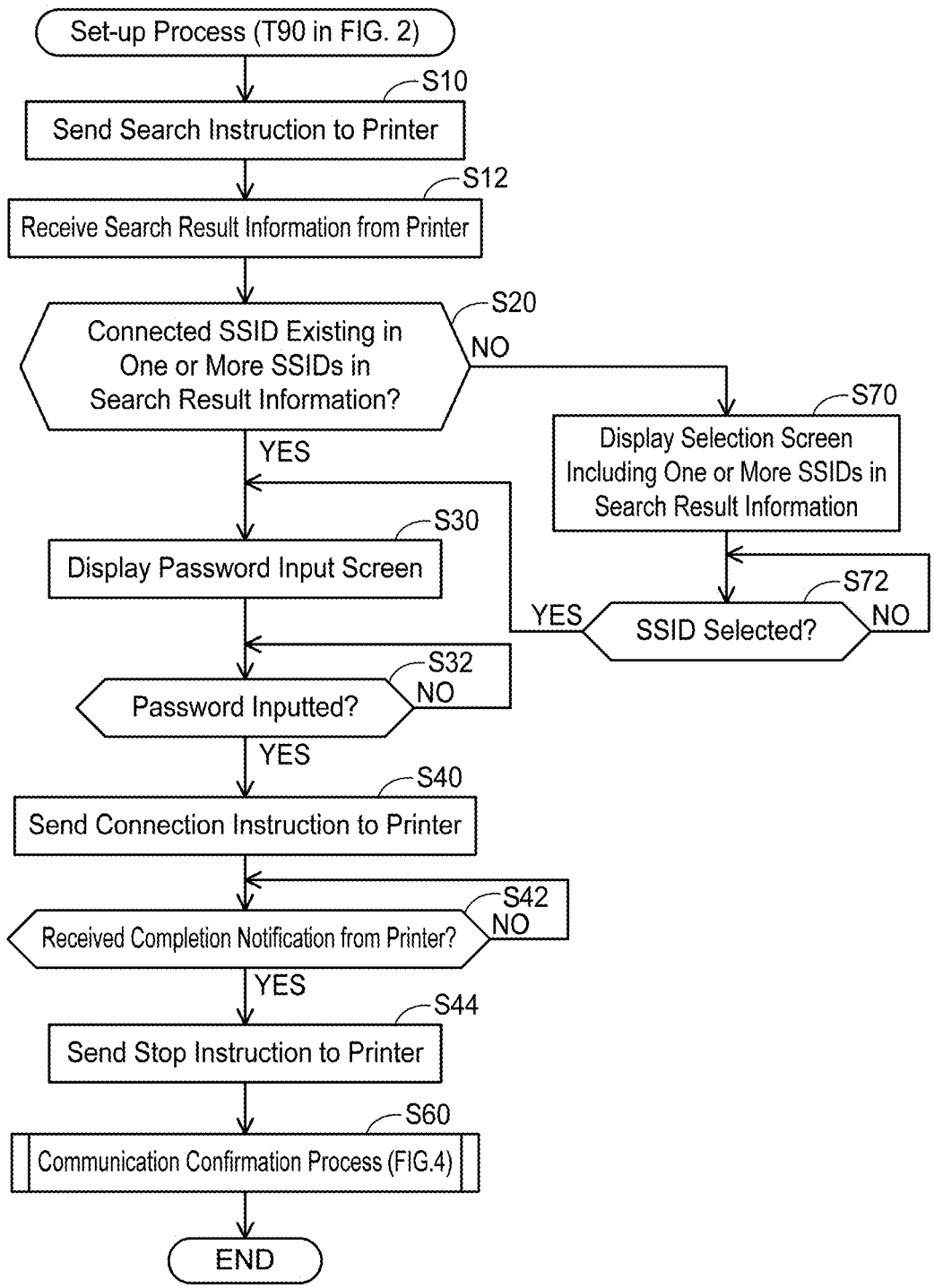
FIG. 3 shows a flowchart of a setup process executed by a terminal device of a first embodiment.

(Setup Process: FIG. 3)

Next, the setup process executed in T90 of FIG. 2 will be described with reference to FIG. 3. The setup process is a process for establishing a Wi-Fi connection between the printer 100 and an AP by sending a connection instruction to the printer 100 using the SoftAP connection.

In S10, the application 40 sends a search instruction to the printer 100 by using the SoftAP connection. The search instruction is an instruction for causing the printer 100 to execute a search for APs existing around the printer 100. Thus, the printer 100 executes the search for APs by sending a Probe request by broadcast. Here, the printer 100 supports only the 2.4 GHz band. Due to this, the printer 100 can send the Probe request using the 2.4 GHz band but cannot send the Probe request using the 5.0 GHz band. Due to this, the printer 100 can find the APs 70, 80 that support the 2.4 GHz band but cannot find the AP 60 that supports the 5.0 GHz band.

In S12, the application 40 receives search result information from the printer 100 using the SoftAP connection. The search result information includes one or more SSIDs identifying one or more APs that were found by the search as above. Specifically, the search result information includes the SSID "YYY" of the AP 70 and the SSID "ZZZ" of the AP 80 but does not include the SSID "XXX" of the AP 60.

In S20, the application 40 determines whether or not the connected SSID obtained in T34 of FIG. 2 exists in the one or more SSIDs in the search result information. The application 40 proceeds to S30 in a case of determining that the connected SSID exists (YES in S20), while the application 40 proceeds to S70 in a case of determining that the connected SSID does not exist (NO in S20). For example, in a case where the connected AP is the AP 70 or the AP 80, the SSID of the AP 70 or the AP 80 (i.e., the connected SSID) exists in the search result information. In this case, the application 40 determines YES in S20 and proceeds to S30. On the other hand, in a case where the connected AP is the AP 60, the SSID of the AP 60 (i.e., the connected SSID) does not exist in the search result information. In this case, the application 40 determines NO in S20 and proceeds to S70.

In S70, the application 40 causes the display unit 14 to display a selection screen including the one or more SSIDs in the search result information. Since the selection screen is displayed as such, the application 40 can send a connection instruction including the SSID selected in the selection screen to the printer 100 in S40 to be described later.

In S72, the application 40 monitors whether or not an SSID is selected in the selection screen displayed in S70. The application 40 determines YES in S72 in a case where an SSID is selected, and proceeds to S30. Hereinbelow, the SSID selected hereof will be termed a "selected SSID", and an AP identified by the selected SSID will be termed a "selected AP".

In S30, the application 40 causes the display unit 14 to display a password input screen. The password input screen is a screen to which a password of an AP with which the printer 100 is to establish a Wi-Fi connection (i.e., the connected AP or the selected AP) is to be inputted. Since the password input screen is displayed as above, the application 40 can send the connection instruction including an inputted password to the printer 100 in S40 to be described later.

In S32, the application 40 monitors whether or not the password is inputted to the password input screen. Then, the application 40 determines YES in S32 in a case where the password is inputted, and proceeds to S40.

In S40, the application 40 sends the connection instruction to the printer 100 by using the SoftAP connection. In the case where YES was determined in S20, this connection instruction includes the connected SSID and the password inputted in S32. In this case, the connection instruction is an instruction for establishing a Wi-Fi connection between the printer 100 and the connected AP. On the other hand, in the case where YES was determined in S72, the connection instruction includes the selected SSID and the password inputted in S32. In this case, the connection instruction is an instruction for establishing a Wi-Fi connection between the printer 100 and the selected AP. Hereinbelow, an AP with which a Wi-Fi connection is to be established according to the connection instruction will be termed a "target AP". Further, the SSID and the password included in the connection instruction will be termed a "target SSID" and a "target password".

When the connection instruction is sent to the printer 100 in S40, the printer 100 executes a process for establishing a Wi-Fi connection with the target AP using the target SSID and the target password included in the connection instruction. Specifically, the printer 100 sends a Probe request and receives a Probe response including the target SSID from the target AP. Thus, the printer 100 can identify a target with which a Wi-Fi connection is to be established is the sender of the Probe response, which is the target AP. Then, the printer 100 executes various types of communication such as Authentication, Association, and 4-Way Handshake with the target AP. In the course of the communication, authentication is executed by the target AP due to the printer 100 sending information obtained by using the target password to the target AP. If this authentication is successful, a Wi-Fi connection is established between the printer 100 and the target AP.

In S42, the application 40 monitors whether or not a completion notification is received from the printer 100 using the SoftAP connection. The completion notification is a notification notifying that the Wi-Fi connection has been established between the printer 100 and the target AP. The application 40 determines YES in S42 in a case of receiving the completion notification from the printer 100 and proceeds to S44. In the case of receiving the completion notification from the printer 100, the application 40 further receives an IP address of the printer 100 from the printer 100 using the SoftAP connection. This IP address is an IP address allocated to the printer 100 by the target AP.

In S44, the application 40 sends a stop instruction to the printer 100 using the SoftAP connection. The stop instruction is an instruction for stopping the SoftAP. Thus, the printer 100 shifts from the state where the SoftAP is activated to the state where the SoftAP is not activated. Due to this, the SoftAP connection between the terminal device 10 and the printer 100 is disconnected. As above, since the SoftAP connection is disconnected, processing load on each of the terminal device 10 and the printer 100 is reduced. Further, the terminal device 10 can re-establish the Wi-Fi connection with the connected AP in a process to be described later.

Figure 4:
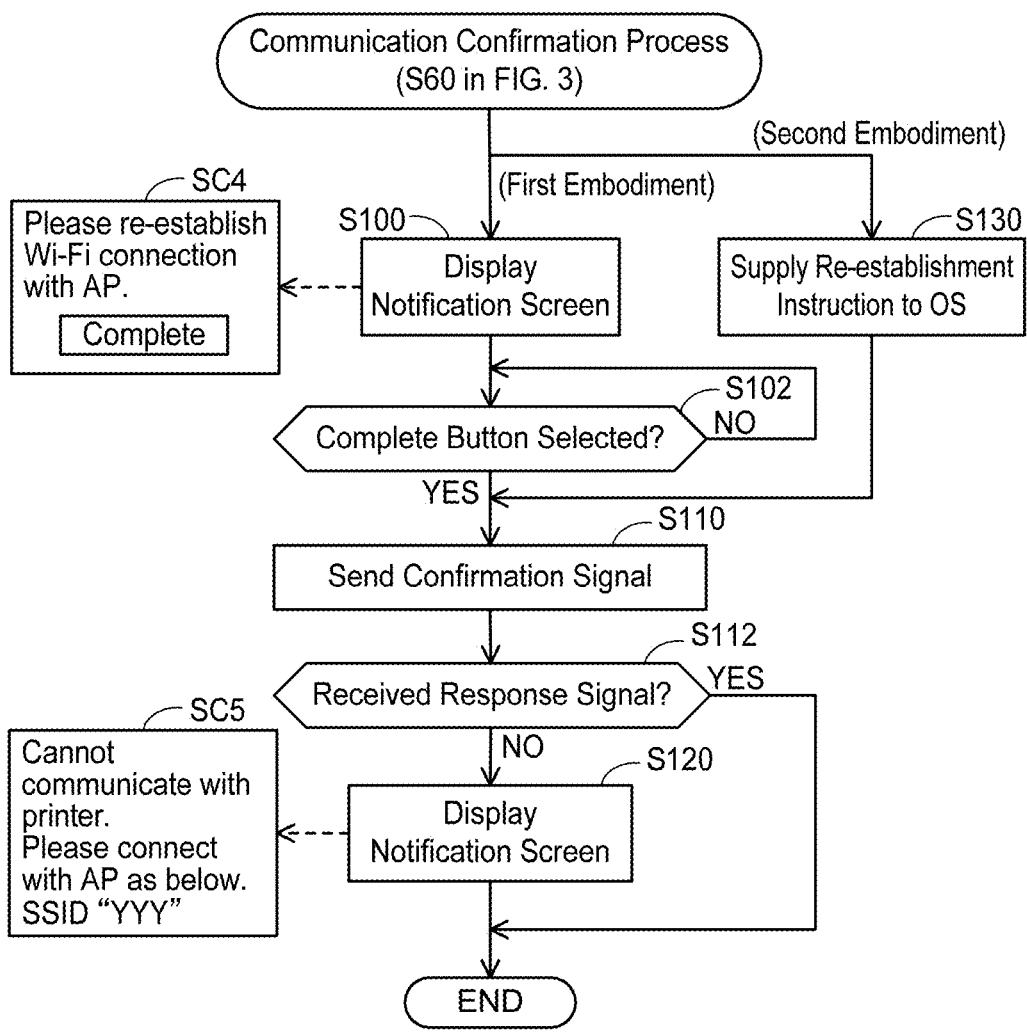
FIG. 4 shows a flowchart of a communication confirmation process.

In S60, the application 40 executes a communication confirmation process (see FIG. 4). When S60 is completed, the process of FIG. 3 is terminated.

(Communication Confirmation Process: FIG. 4)

Next, the communication confirmation process executed in S60 of FIG. 3 will be described with reference to FIG. 4. The communication confirmation process is a process for confirming whether or not communication is executable between the terminal device 10 and the printer 100.

In S100, the application 40 causes the display unit 14 to display a notification screen SC4. The notification screen SC4 includes a message prompting the user to re-establish the Wi-Fi connection with the AP and a Complete button. Thus, the user can acknowledge that the Wi-Fi connection between the terminal device 10 and the AP (i.e., the connected AP with which the Wi-Fi connection was disconnected in T64 of FIG. 2) should be re-established and performs an operation therefor. Specifically, similar to T50 of FIG. 2, the user operates the setting button displayed by the OS 36. As a result, the OS 36 sends a Probe request by broadcast, receives Probe responses from the respective APs 60 to 80, and causes the display unit 14 to display a selection screen including the SSIDs of the respective APs 60 to 80. Then the user selects the SSID of the connected AP in the selection screen. In this case, the OS 36 re-establishes the Wi-Fi connection with the connected AP. Since the OS 36 stores the password of the connected AP as history information, it can re-establish the Wi-Fi connection with the connected AP without requesting the user to input the password. Hereinbelow, the Wi-Fi connection hereby re-established will be termed a "re-established connection".

In S102, the application 40 monitors whether the Complete button in the notification screen SC4 is operated. The application 40 determines YES in S102 in a case where the Complete button is operated and proceeds to S110.

In S110, the application 40 sends a confirmation signal (such as a ping signal) using the re-established connection. The confirmation signal includes the IP address of the printer 100 received in S42 of FIG. 3 as its destination address.

In S112, the application 40 determines whether or not it has received a response signal, which is a response to the confirmation signal, from the printer 100 using the re-established connection. The application 40 determines YES in S112 in a case of receiving the response signal from the printer 100, skips S120, and terminates the process of FIG. 4. On the other hand, the application 40 determines NO in S112 and proceeds to S120 in a case of not receiving the response signal from the printer 100 even though a predetermined time has elapsed since the confirmation signal was sent in S110.

In S120, the application 40 causes the display unit 14 to display a notification screen SC5. The notification screen SC5 includes a message indicating that the communication with the printer 100 is not executable and a message indicating that a Wi-Fi connection should be newly established with an AP. Especially, the latter message includes the target SSID included in the connection instruction sent in S40 of FIG. 3. That is, the latter message includes the SSID of the target AP with which the printer 100 currently has the Wi-Fi connection established. Thus, the user can cause a Wi-Fi connection to be established between the terminal device 10 and the target AP, as a result of which communication via the target AP can be executed between the terminal device 10 and the printer 100. When S120 is completed, the process of FIG. 4 is terminated.

Figure 5:
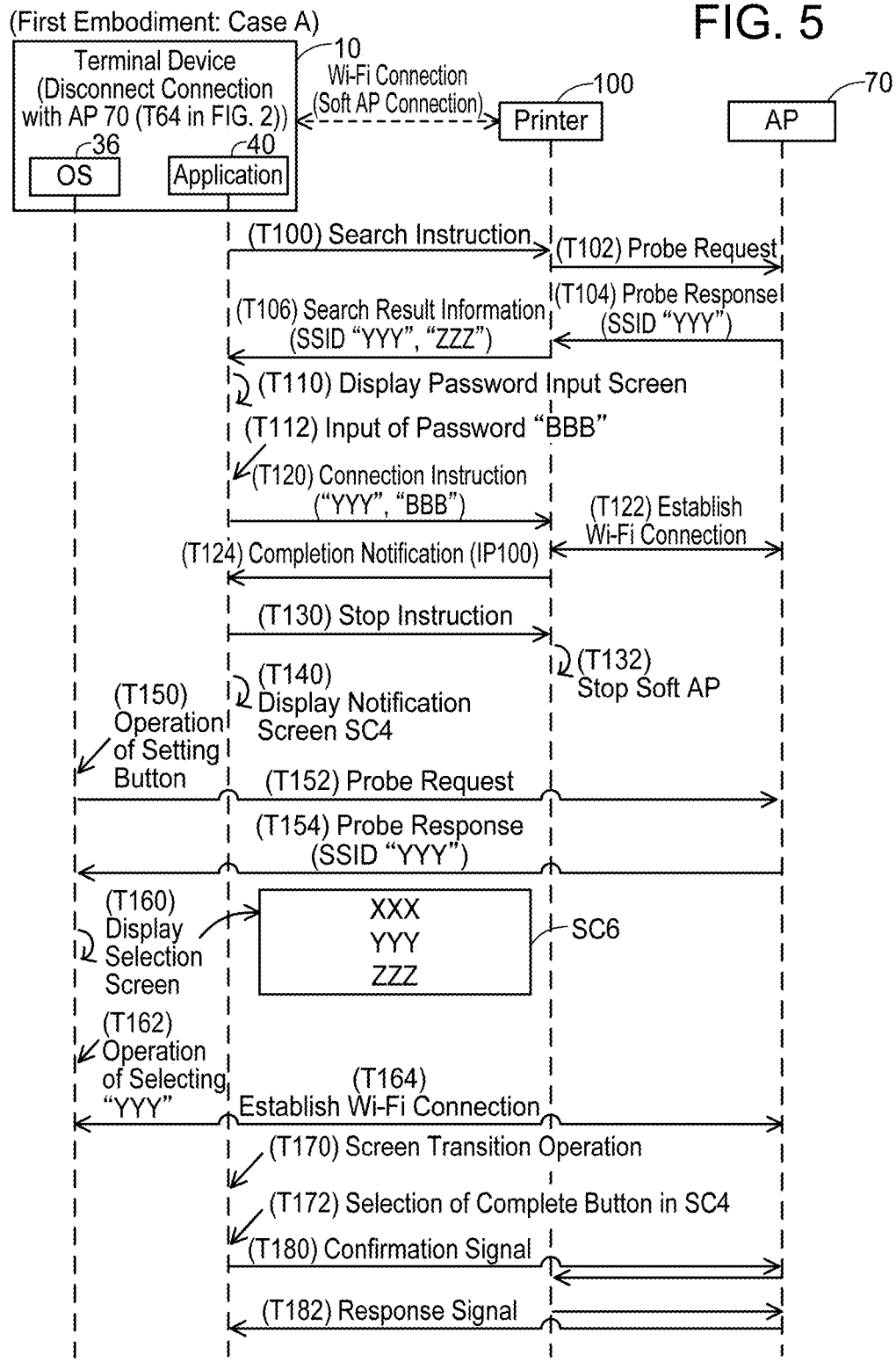
FIG. 5 shows a sequence diagram of Case A of the first embodiment.

(Case A: FIG. 5)

Next, specific cases realized by the processes of FIGS. 3 and 4 will be described with reference to FIGS. 5 to 7. Firstly, Case A will be described with reference to FIG. 5. In Case A, the connected AP of the terminal device 10 is the AP 70, and the Wi-Fi connection between the terminal device 10 and the AP 70 is disconnected in T64 of FIG. 2.

In T100, the application 40 sends the search instruction to the printer 100 using the SoftAP connection (S10 of FIG. 3). In this case, the printer 100 sends the Probe request in T102 and receives the Probe response from the AP 70 in T104. The printer 100 also receives the Probe response from the AP 80 (not shown). Then, in T106, the printer 100 sends the search result information including the SSID "YYY" of the AP 70 and the SSID "ZZZ" of the AP 80 to the terminal device 10 using the SoftAP connection.

When receiving the search result information from the printer 100 in T106 (S12), the application 40 determines that the connected SSID "YYY" exists in the search result information (YES in S20) and causes the display unit 14 to display the password input screen in T110 (S30). When the password "BBB" is inputted in T112 (YES in S32), the application 40 sends the connection instruction including the connected SSID "YYY" and the inputted password "BBB" to the printer 100 using the SoftAP connection in T120 (S40).

When receiving the connection instruction from the terminal device 10 in T120, the printer 100 establishes a Wi-Fi connection with the AP 70 in T122 using the SSID "YYY" and the password "BBB" in the connection instruction. Then, in T124, the printer 100 sends the completion notification including the IP address "IP100" of the printer 100 to the terminal device 10 using the SoftAP connection.

When receiving the completion notification from the printer 100 in T124 (YES in S42), the application 40 sends the stop instruction to the printer 100 using the SoftAP connection in T130 (S44).

When receiving the stop instruction from the terminal device 10 in T130, the printer 100 shifts from the state where the SoftAP is activated to the state where the SoftAP is not activated in T132. Thus, the SoftAP connection is disconnected.

Next, in T140, the application 40 causes the display unit 14 to display the notification screen SC4 (S100 of FIG. 4). Thus, in T150, the setting button is operated among the plurality of buttons displayed by the OS 36. In this case, the OS 36 sends the Probe request in T152 and receives the Probe response from the AP 70 in T154. The OS 36 also receives the Probe response from each of the APs 60, 80 (not shown).

In T160, the OS 36 causes the display unit 14 to display a selection screen SC6 including the SSIDs included in the respective received Probe responses. Then, in T162, the SSID "YYY" of the AP 70, which had been the connected AP, is selected in the selection screen SC6. In this case, the OS 36 re-establishes the Wi-Fi connection with the AP 70 in T164.

When the Wi-Fi connection is re-established with the AP 70 (T164), the OS 36 causes the display unit 14 to display a screen indicating the re-establishment (not shown). The user can acknowledge that the Wi-Fi connection has been established by looking at this screen. In this case, in T170, the user performs the operation for causing the screen of the application 40 to be displayed instead of the screen of the OS 36. Thus, the notification screen SC4 displayed in T140 is displayed again, and the Complete button in the notification screen SC4 is operated by the user in T172.

When the Complete button is operated in T172 (YES in S102), the application 40 sends in T180 the confirmation signal including the IP address "IP100" (see T124) of the printer 100 as the destination address to the AP 70 using the Wi-Fi connection established in T164 (S110). Thus, the confirmation signal is sent to the printer 100 via the AP 70, and the application 40 receives the response signal from the printer 100 via the AP 70 in T182 (YES in S112). Due to this, the application 40 can confirm that the terminal device 10 is capable of communicating with the printer 100.

In the present case, the terminal device 10 can communicate with the printer 100 because the terminal device 10 and the printer 100 are connected to the same AP 70. Due to this, the application 40 can send image data representing an image to be printed to the printer 100 via the AP 70 and cause the printer 100 to execute printing of this image (not shown).

(Case B: FIG. 6)

Next, Case B will be described with reference to FIG. 6. In Case B, the connected AP of the terminal device 10 is the AP 60, and the Wi-Fi connection between the terminal 10 and the AP 60 is disconnected in T64 of FIG. 2. Further, the AP 60 and the AP 70 are connected to the same router 90. Due to this, communication via the AP 60, the AP 70, and the router 90 can be executed between a device having a Wi-Fi connection established with the AP 60 and a device having a Wi-Fi connection established with the AP 70.

T200 to T206 are similar to T100 to T106 of FIG. 5. When receiving the search result information from the printer 100 in T206 (S12 of FIG. 3), the application 40 determines that the connected SSID "XXX" does not exist in the search result information (NO in S20) and causes the display unit 14 to display a selection screen SC7 including the SSIDs "YYY" and "ZZZ" in the search result information in T210 (S70). The SSID "YYY" is selected in the selection screen SC7 in T212. After this, processes similar to T110 to T154 of FIG. 5 are executed. That is, the Wi-Fi connection is established between the printer 100 and the AP 70 (see T122).

In T260, the OS 36 causes the display unit 14 to display the selection screen SC6. Then, in T262, the SSID "XXX" of the AP 60 that had been the connected AP is selected in the selection screen SC6. In this case, the OS 36 re-establishes the Wi-Fi connection with the AP 60 identified by the SSID "XXX" in T264.

T270 and T272 are similar to T170 and T172 of FIG. 5. The application 40 sends the confirmation signal to the AP 60 in T280 (S110). Due to this, the confirmation signal is sent to the printer 100 via the AP 60, the router 90, and the AP 70. Then, the application 40 receives the response signal from the printer 100 in T282 via the AP 70, the router 90, and the AP 60 (YES in S112).

In the present case, even though the terminal device 10 and the printer 100 are connected to different APs 60 and 70 respectively, the terminal device 10 is capable of communicating with the printer 100. Thus, the application 40 can send image data representing an image to be printed to the printer 100 via the AP 60, the router 90, and the AP 70 (not shown).

(Case C: FIG. 7)

Next, Case C will be described with reference to FIG. 7. In Case C, similar to Case B of FIG. 6, the connected AP of the terminal device 10 is the AP 60 and the Wi-Fi connection between the terminal 10 and the AP 60 is disconnected in T64 of FIG. 2. Further, unlike Case B of FIG. 6, the AP 60 and the AP 70 are not connected to the same router 90. Due to this, communication cannot be executed between a device having the Wi-Fi connection established with the AP 60 and a device having the Wi-Fi connection established with the AP 70.

Figure 6:
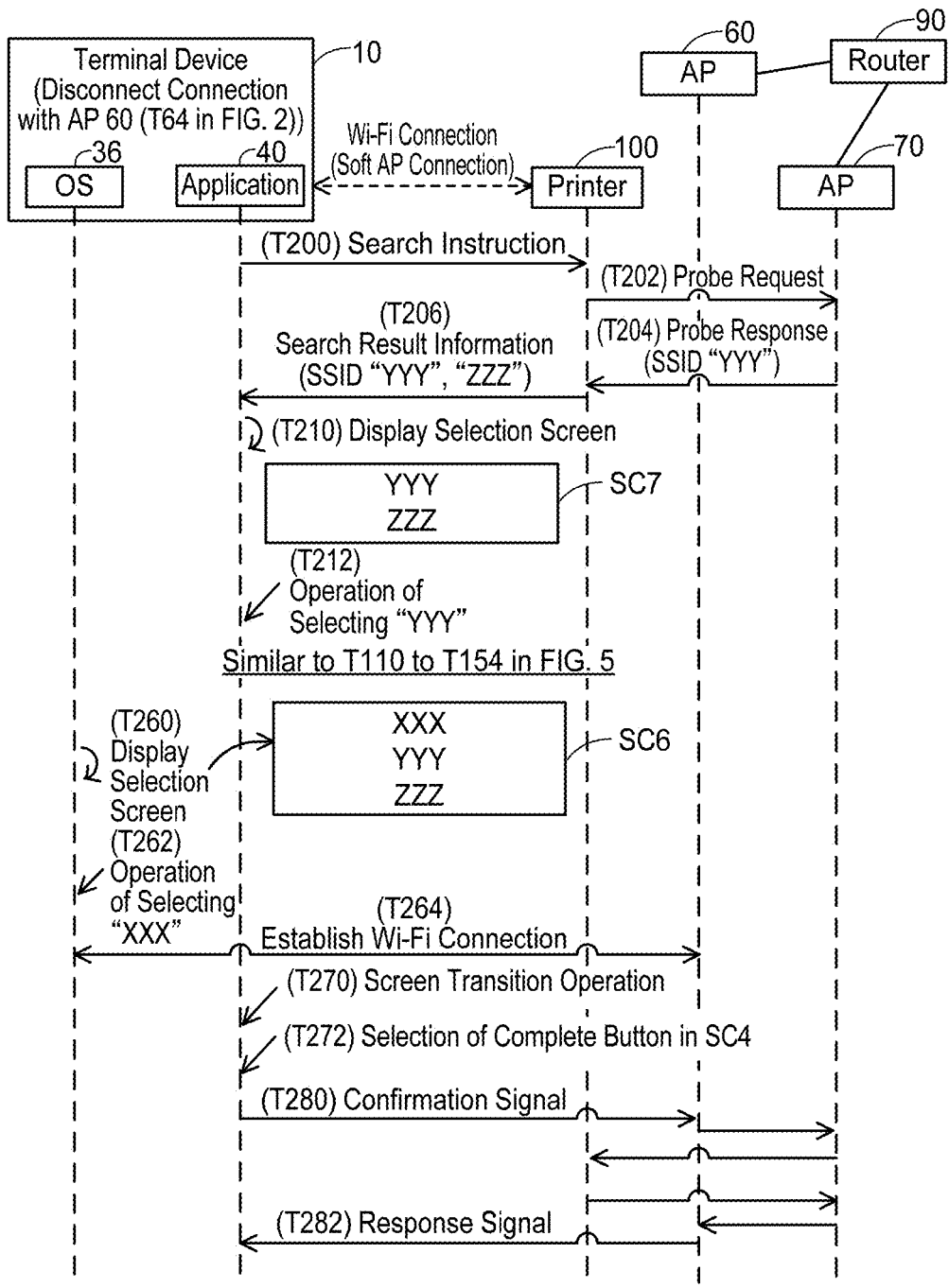
FIG. 6 shows a sequence diagram of Case B of the first embodiment.
Figure 7:
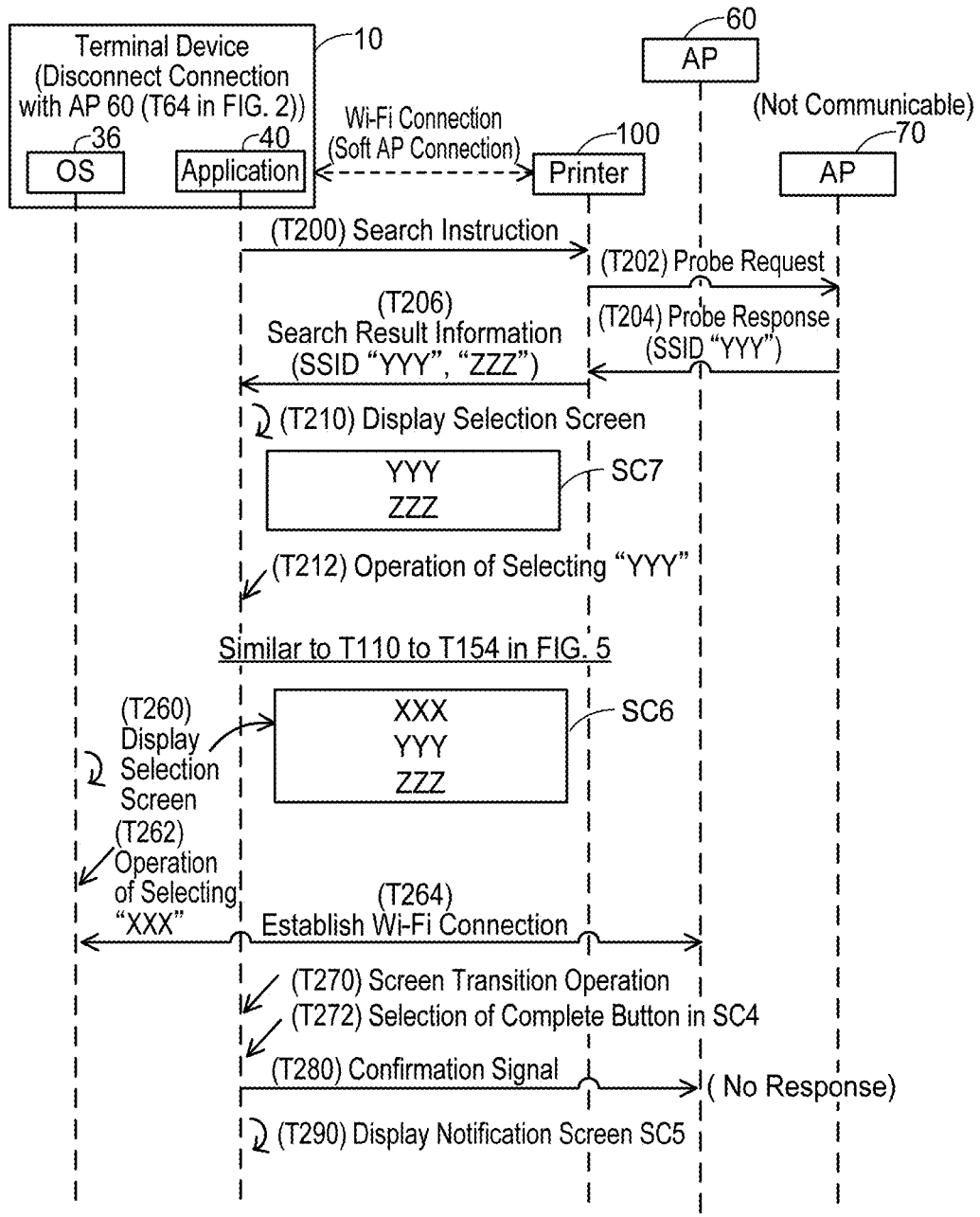
FIG. 7 shows a sequence diagram of Case C of the first embodiment.

T200 to T272 are similar to T200 to T272 of FIG. 6. In T280, the application 40 sends the confirmation signal to the AP 60 (S110 of FIG. 4). However, this confirmation signal is not sent to the printer 100. In this case, the application 40 does not receive a response signal from the printer 100 (NO in S112) and displays the notification screen SC5 in T290 (S120).

By looking at the notification screen SC5, the user can acknowledge that the terminal device 10 should establish a Wi-Fi connection with the AP 70 identified by the SSID "YYY". Due to this, the user operates the setting button as in T150 of FIG. 5, selects the SSID "YYY" in the selection screen SC6 displayed in T160 of FIG. 5, and inputs the password "BBB" (not shown). In this case, the terminal device 10 disconnects the Wi-Fi connection with the AP 60 and establishes a Wi-Fi connection with the AP 70. As a result of this, the terminal device 10 and the printer 100 are connected to the same AP 70. Due to this, the application 40 can send image data representing an image to be printed to the printer 100 via the AP 70.

(Effects of Present Embodiment)

The display unit 114 of the printer 100 is generally small as compared to the display unit 14 of the terminal device 10, and the operation unit 112 of the printer 100 is generally more difficult to operate than the operation unit 12 of the terminal device 10. As such, it is difficult for the user to cause a Wi-Fi connection to be established between the printer 100 and an AP by selecting the SSID of the AP and inputting the password of the AP on the printer 100. According to the present embodiment, the user can cause a Wi-Fi connection to be established between the printer 100 and an AP by using the terminal device 10, without selecting the SSID nor inputting the password on the printer 100. Thus, the user can easily cause a Wi-Fi connection to be established between the printer 100 and the AP.

Especially, according to the present embodiment, the terminal device 10 sends the search instruction to the printer 100 (T100 of FIG. 5) and receives from the printer 100 the search result information including the two SSIDs "YYY" and "ZZZ" identifying the two APs 70, 80 that were found by the search (T106). Here, the two APs 70, 80 being found by the search executed by the printer 100 means that the printer 100 can establish a Wi-Fi connection with whichever of the two APs 70 and 80, but cannot establish a wireless connection with the AP 60, which is other than the two Aps 70 and 80. In the case where the connected SSID "YYY" exists in the two SSIDs "YYY" and "ZZZ" (Case A of FIG. 5), that is, in the case where the printer 100 can establish a Wi-Fi connection with the AP 70, the terminal device 10 sends the connection instruction including the SSID "YYY" to the printer 100 (T120). By doing so, the printer 100 can establish a Wi-Fi connection with the AP 70 (T122). On the other hand, in the case where the connected SSID "XXX" does not exist in the two SSIDs "YYY" and "ZZZ" in the search result information (Case B of FIG. 6 or Case C of FIG. 7), that is, in the case where the printer 100 cannot establish a Wi-Fi connection with the connected AP 60, the terminal device 10 sends the connection instruction including the SSID "YYY" to the printer 100 instead of the connection instruction including the SSID "XXX" (T120 of FIG. 5 applied in FIGS. 6 and 7). Due to this, the printer 100 can establish a Wi-Fi connection with the AP 70 (T122 of FIG. 5 applied in FIGS. 6 and 7). Thus, a possibility of establishing a Wi-Fi connection between the printer 100 and an AP can be increased.

Here, by searching APs existing around the terminal device 10, the OS 36 can acknowledge that the AP 60 supports the 5.0 GHz band and the APs 70, 80 each support the 2.4 GHz band. For example, a configuration of a comparative example will be assumed in which in a situation where the connected AP is the AP 60, the OS 36 supplies the SSID "XXX" of the connected AP 60 and frequency information indicating 5.0 GHz supported by the AP 60 to the application 40 in T34 of FIG. 2. When a configuration in which the application 40 acknowledges in advance that the printer 100 supports only the 2.4 GHz is employed, the application 40 can determine that the printer 100 cannot establish a Wi-Fi connection with the AP 60. Due to this, the application 40 can prompt the user to designate another AP. That is, in the configuration of the comparative example, the application 40 can determine whether the printer 100 can establish a Wi-Fi connection with the connected AP without sending the search instruction to the printer 100 (see T100 of FIG. 5) and obtaining the search result information from the printer 100. However, the present embodiment assumes a situation in which the application 40 cannot obtain the aforementioned frequency information from the OS 36 due to restriction on the OS 36. Due to this, the application 40 determines whether or not the printer 100 can establish a Wi-Fi connection with the connected AP (S20 of FIG. 3) by sending the search instruction to the printer 100 and receiving the search result information from the printer 100. As such, in the present embodiment, even with the aforementioned restriction on the OS 36, the application 40 can suitably determine whether or not the printer 100 can establish a Wi-Fi connection with the connected AP.

(Corresponding Relationship)

The printer 100 is an example of a "communication device". In Case A of FIG. 5, the AP 70 (i.e., the connected AP) is an example of a "first access point". In Case B of FIG. 6 and Case C of FIG. 7, the AP 60 (i.e., the connected AP) is an example of the "first access point", and the AP 70 is an example of a "second access point". The Wi-Fi connection established between the terminal device 10 and one of the APs in the initial state of FIG. 2 is an example of a "first wireless connection". The connected SSID obtained in T34 of FIG. 2 is an example of a "first identifier". The Wi-Fi connection (i.e., the SoftAP connection) established in T70 of FIG. 2 is an example of a "second wireless connection". The connection instruction sent in S40 following YES in S20 of FIG. 3 (i.e., the connection instruction of T120 of FIG. 5) is an example of a "first connection instruction". The connection instruction sent in S40 following YES in S72 of FIG. 3 (i.e., the connection instruction of T120 of FIG. 5 applied in FIGS. 6 and 7) is an example of a "second connection instruction". The selection screen displayed in S70 of FIG. 3 is an example of a "first identifier selection screen". The notification screen SC4 displayed in S100 and the notification screen SC5 displayed in S120 of FIG. 4 are respectively examples of a "first notification screen" and a "second notification screen". The operation in T150 and the operation in T162 of FIG. 5 are examples of a "predetermined operation".

T34 of FIG. 2 is an example of "acquire a first identifier". S10, S12, S20, S30, and S70 of FIG. 3 are respectively examples of "send a search instruction", "receive search result information", "determine whether the first identifier exists in the N identifiers", "cause a display unit of the terminal device to display a password input screen", and "cause a display unit of the terminal device to display a first identifier selection screen". S40 following YES in S20 and S40 following YES in S72 of FIG. 3 are respectively examples of "send a first connection instruction" and "send a second connection instruction". S100, S112, and S120 of FIG. 4 are respectively examples of "cause a display unit of the terminal device to display a first notification screen", "determine whether communication via the first access point between the terminal device and the communication device is executable", and "cause a display unit of the terminal device to display a second notification screen".

The operation of T20 of FIG. 2 is an example of a "specific operation". The state in which the printer 100 is not activating the SoftAP and the state in which the printer 100 is activating the SoftAP are respectively examples of a "non-parent state" and a "parent state".

T22 and T70 of FIG. 2 are respectively examples of "shift a state of the communication device" and "establish a second wireless connection". T100, T102, T106, T120, T122, and T132 of FIG. 5 are respectively examples of "receive a search instruction", "execute the search", "send search result information", "receive a first connection instruction", "establish a wireless connection between the communication device and the first access point", and "disconnect the second wireless connection". T120 and T122 of FIG. 5 applied in FIGS. 6 and 7 are respectively examples of "receive a second connection instruction" and "establish a wireless connection between the communication device and a second access point".

Second Embodiment

Figure 8:
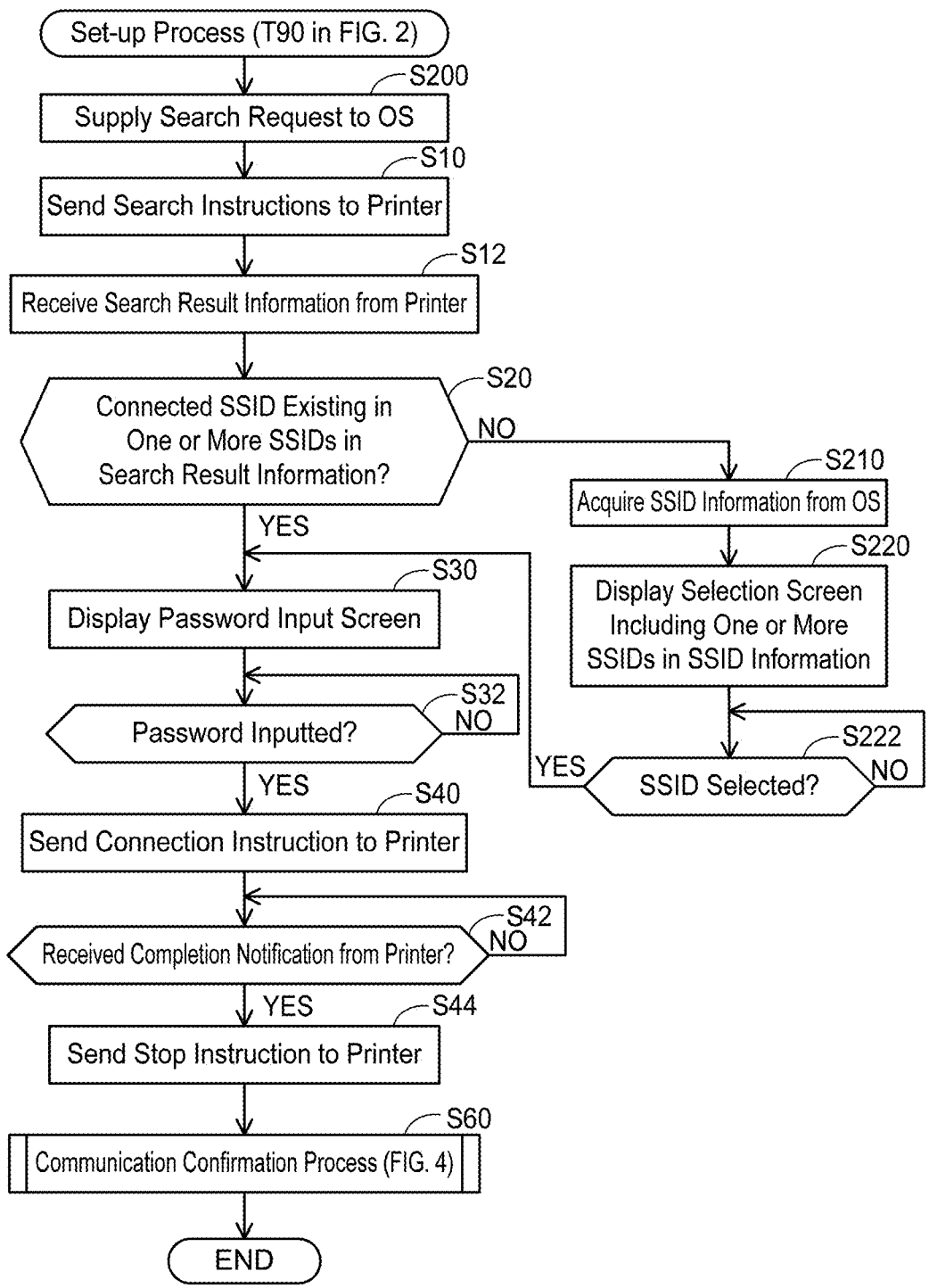
FIG. 8 shows a flowchart of a setup process executed by a terminal device of a second embodiment.

Next, a second embodiment will be described. The present embodiment differs from the first embodiment in that the OS 36 of the terminal device 10 is a second type of OS instead of the first type of OS. Further, in the present embodiment, a setup process of FIG. 8 is executed instead of the setup process of FIG. 3.

The first type of OS of the first embodiment can supply the information related to the connected AP, which is among the APs which the terminal device 10 found by a search, to the application 40, however, it cannot supply information on the APs other than the connected AP to the application 40. Due to this, in S70 of FIG. 3, the application 40 causes the display unit 14 to display the selection screen including the respective SSIDs in the search result information received from the printer 100.

Contrary to this, the second type of OS of the second embodiment can supply the information on all of the APs which the terminal device 10 found by a search to the application 40. Due to this, the application 40 causes the display unit 14 to display a selection screen including respective SSIDs obtained from the OS 36 instead of the selection screen of S70 of FIG. 3. Hereinbelow, this feature will be described in detail with reference to FIG. 8.

(Setup Process: FIG. 8)

In S200, the application 40 supplies a search request to the OS 36. The search request is a command for requesting the OS 36 to search for APs existing around the terminal device 10. Thus, the OS 36 sends a Probe request by broadcast and receives Probe responses from the respective APs 60 to 80. Then, the OS 36 generates SSID information including the SSIDs included in the respective received Probe responses. S10 to S20 executed thereafter are similar to S10 to S20 of FIG. 3.

In the case of determining NO in S20, the application 40 obtains the SSID information from the OS 36 in S210. Then, in S220, the application 40 causes the display unit 14 to display a selection screen including the respective SSIDs in the SSID information. Since the selection screen is displayed as above, in S40 to be described later, the application 40 can send the connection instruction including an SSID selected in the selection screen to the printer 100. Here, in a case where the SSID included in the search result information received in S12 and an SSID that is not included in the search result information exist in the SSIDs in the SSID information obtained in S210, the application 40 displays the selection screen including the former SSID displayed in a selectable manner and the latter SSID displayed in a non-selectable manner. Since the SSID in the non-selectable manner is displayed, the user can acknowledge that there is the AP with which the printer 100 cannot establish a Wi-Fi connection among the APs which the terminal device 10 found by the search.

S222 is similar to S72 of FIG. 3. The application 40 proceeds to S30 in a case of YES in S222. S30 to S60 executed thereafter are similar to S30 to S60 of FIG. 3.

(Communication Confirmation Process: FIG. 4)

Further, in the present embodiment, contents of the communication confirmation process of FIG. 4 is different from that of the first embodiment. The first type of OS of the first embodiment cannot establish a Wi-Fi connection with an AP by receiving an instruction from the application 40. Due to this, the application 40 causes the display unit 14 to display the notification screen SC4 in S100 of FIG. 4 to prompt the user to re-establish the Wi-Fi connection with the connected AP (see T150 to T164 of FIG. 5).

Contrary to this, the second type of OS of the second embodiment can establish a Wi-Fi connection with an AP by receiving an instruction from the application 40. Due to this, the application 40 supplies a re-establishment instruction including the connected SSID (see T34 of FIG. 2) to the OS 36 in S130 of FIG. 4. Thus, the OS 36 re-establishes the Wi-Fi connection with the connected AP identified by the connected SSID. As such, since the re-establishment instruction is supplied to the OS 36, the OS 36 can re-establish the Wi-Fi connection with the connected AP without accepting any operation from the user. Due to this, user convenience can be improved. When S130 is completed, the application 40 proceeds to S110. Processes from S110 are similar to those of the first embodiment.

Figure 9:
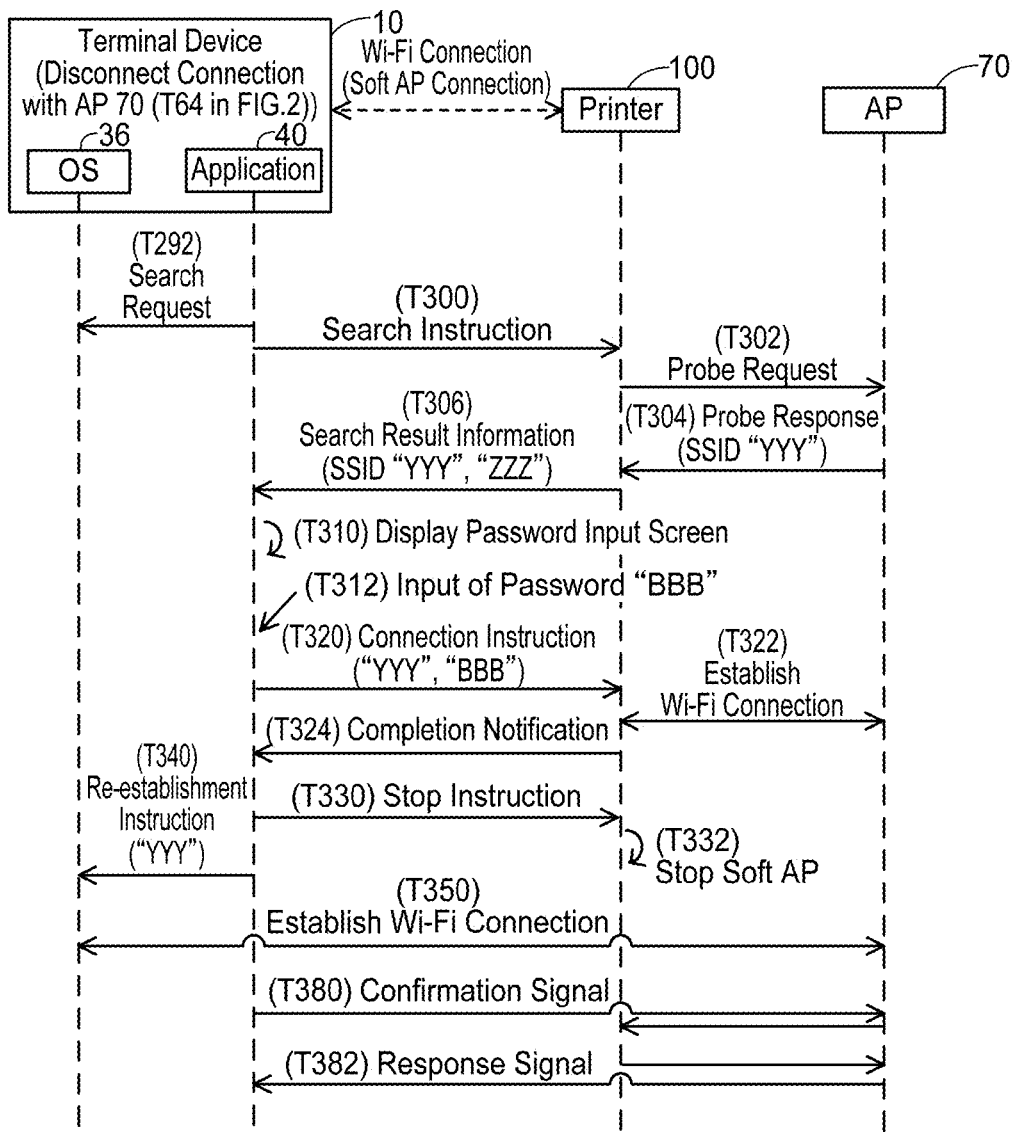
FIG. 9 shows a sequence diagram of Case D of the second embodiment.

(Case D: FIG. 9)

Next, specific cases realized by the processes of FIGS. 8 and 4 will be described with reference to FIGS. 9 and 10. Firstly, Case D will be described with reference to FIG. 9. Case D has an initial state similar to that of Case A of FIG. 5. That is, in Case D, the connected AP of the terminal device 10 is the AP 70.

The application 40 supplies the search request to the OS 36 in T292 (S200 of FIG. 8). Thus, the OS 36 sends the Probe request and receives the Probe responses from the respective APs 60 to 80 (not shown; similar to T152 and T154 of FIG. 5).

T300 to T332 are similar to T100 to T132 of FIG. 5. The application 40 supplies the re-establishment instruction including the connected SSID "YYY" to the OS 36 in T340 (S130 of FIG. 4). In this case, in T350, the OS 36 re-establishes the Wi-Fi connection with the connected AP 70 identified by the SSID "YYY". T380 and T382 are similar to T180 and T182 of FIG. 5.

(Case E: FIG. 10)

Next, Case E will be described with reference to FIG. 10. Case E has an initial state similar to that of Case B of FIG. 6. That is, in Case E, the connected AP of the terminal device 10 is the AP 60, and the AP 60 and the AP 70 are connected to the same router 90.

T392 is similar to T292 of FIG. 9. T400 to T406 are similar to T300 to T306 of FIG. 9. The application 40 determines that the connected SSID "XXX" does not exist in the search result information (NO in S20 of FIG. 3) and obtains the SSID information from the OS 36 in T408. The SSID information includes the SSID "XXX", etc. of the respective APs 60 to 80 found by the search conducted in response to the search request of T392.

In T410, the application 40 displays a selection screen SC8 including the SSIDs in the SSID information. Here, since the SSID "XXX" in the SSID information is not included in the search result information, the application 40 displays the SSID "XXX" in the non-selectable manner. In the present embodiment, displaying in the non-selectable manner is a so-called gray out. However, in a variant, another display manner may be employed. Further, since the SSIDs "YYY" and "ZZZ" in the SSID information are included in the search result information, the application 40 displays the SSIDs "YYY" and "ZZZ" in the selectable manner.

When "YYY" is selected in the selection screen SC8 in T412, processes similar to T310 to T340 of FIG. 9 are executed. As a result, the Wi-Fi connection is re-established between the terminal device 10 and the AP 60 in T450. T480 and T482 are similar to T480 and T482 of FIG. 6.

(Effects of Present Embodiment)

In the present embodiment as well, the possibility of establishing a Wi-Fi connection between the printer 100 and an AP can be increased, similar to the first embodiment. Especially, the second type of OS in the present embodiment cannot supply the frequency information of the connected AP to the application 40, similar to the first type of OS of the first embodiment. In the present embodiment as well, the application 40 can suitably determine whether or not the printer 100 can establish a Wi-Fi connection with the connected AP even with the restriction on the OS 36.

(Corresponding Relationship)

Figure 10:
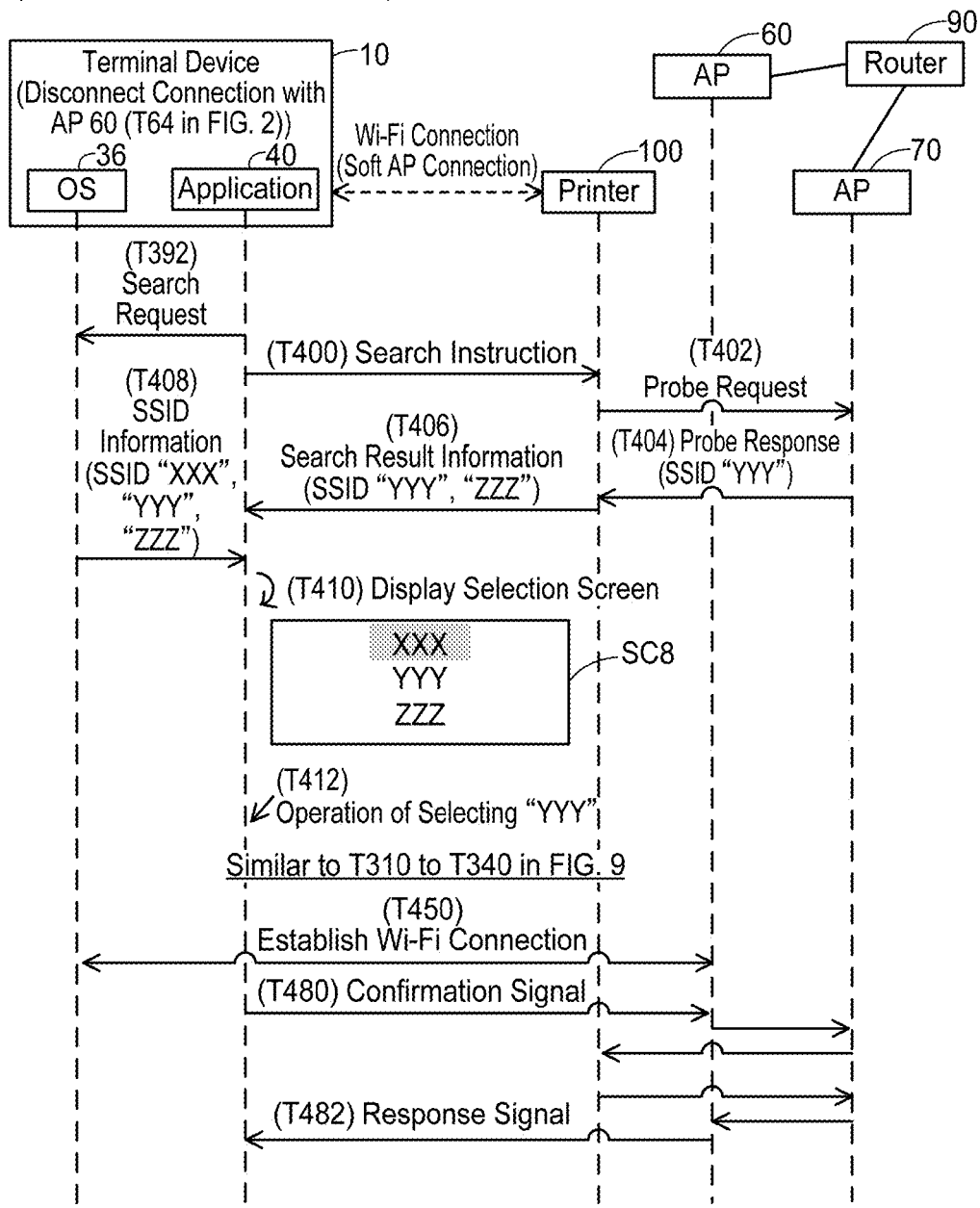
FIG. 10 shows a sequence diagram of Case E of the second embodiment.

The three SSIDs obtained in T408 of FIG. 10 are an example of "M identifiers". The selection screen SC8 in T410 is an example of a "second identifier selection screen". The SSIDs "YYY" and "ZZZ" included in the selection screen SC8 are an example of "M1 identifiers", and the SSID "XXX" included in the selection screen SC8 is an example of "M2 identifiers". S210 and S220 of FIG. 8 are respectively examples of "acquire M identifiers" and "cause a display unit of the terminal device to display a second identifier selection screen". S130 of FIG. 4 is an example of "supply a re-establishment instruction".

(Variant 1)

The application 40 may obtain the password of the connected AP together with the connected SSID from the OS 36 in T34 of FIG. 2. In this case, in the case of determining YES in S20 of FIG. 3, the application 40 may send the connection instruction including the SSID and the password to the printer 100 in S40, without displaying the password input screen in S30. In this variant, "cause a display unit of the terminal device to display a password input screen" may be omitted. Further, in another variant, in a case where the AP identified by the connected SSID determined as YES in S20 or the selected SSID determined as YES in S72 in FIG. 3 is not configured to execute the password authentication, the application 40 may send the connection instruction that includes the SSID but does not include any password to the printer 100 in S40, without displaying the password input screen in S30. In this variant as well, "cause a display unit of the terminal device to display a password input screen" may be omitted.

(Variant 2)

In S70 of FIG. 3 and/or S220 of FIG. 8, the application 40 may cause the display unit 14 to display an input screen to which an SSID is inputted, instead of the selection screen. In this case, the application 40 may send the connection instruction including the inputted SSID to the printer 100 in S40. In this variant, "cause a display unit of the terminal device to display a first identifier selection screen" and/or "cause a display unit of the terminal device to display a second identifier selection screen" may be omitted.

(Variant 3)

In S220 of FIG. 8, the application 40 may display an SSID that is included in the SSID information but not included in the search result information in the selectable manner. In general terms, M2 identifiers having a non-selectable manner may not be displayed.

(Variant 4)

In S110 of FIG. 4, the application 40 may send the confirmation signal by broadcast instead of sending the confirmation signal including the IP address of the printer 100 as the destination address. In this case, the application 40 determines YES in S112 in a case where a response signal including the IP address of the printer 100 as its sender address exists among plural response signals received from the respective devices, while it determines NO in S112 in a case where this response signal does not exist. In general terms, the "confirmation signal" may be sent by unicast as in the embodiments above, or may be sent by broadcast as in this variant.

(Variant 5)

The application 40 may not execute S110 to S120 of FIG. 4. In this variant, "determine whether a communication via the first access point between the terminal device and the communication device is executable" and "cause a display unit of the terminal device to display a second notification screen" may be omitted.

(Variant 6)

The printer 100 may operate as the SoftAP at all times while its power is ON. In this variant, "shift a state of the communication device" may be omitted.

(Variant 7)

In the case where the operation is performed in T20 of FIG. 2, the printer 100 may shift from a state where it does not operate as a Group Owner of a Wi-Fi Direct (registered trademark, WFD) scheme to a state where it operates as the Group Owner, instead of activating the SoftAP. In this variant, the state where the printer 100 operates as the Group Owner is an example of a "parent state".

(Variant 8)

The application 40 may not send the stop instruction to the printer 100 in S44 of FIG. 3. In this case, the SoftAP connection between the terminal device 10 and the printer 100 is not disconnected. In this variant, "disconnect the second wireless connection" may be omitted.

(Variant 9)

The "communication device" may not be the printer 100, and may be another device such as a scanner, a multifunction peripheral, a portable terminal, a PC, or a server.

(Variant 10)

In the embodiments as above, the respective processes of FIGS. 2 to 10 are executed by software (such as the application 40), however, at least one of these processes may be realized by hardware such as a logic circuit.

What is claimed is:

1. A non-transitory computer-readable recording medium storing computer-readable instructions for a terminal device, wherein the terminal device comprises:

a wireless interface configured to execute wireless communication according to Wi-Fi standard; and a processor, wherein the computer-readable instructions, when executed by the processor, cause the terminal device to:

in a case where a first wireless connection has been established between the terminal device and a first access point via the wireless interface, acquire a first identifier identifying the first access point from an Operating System (OS) program of the terminal device, in a case where a second wireless connection is established between the terminal device and a communication device via the wireless interface, send a search instruction to the communication device via the wireless interface using the second wireless connection, the search instruction being for causing the communication device to execute a search for an access point existing around the communication device;

in a case where the search is executed by the communication device in response to the search instruction having been sent to the communication device, receive search result information from the communication device via the wireless interface using the second wireless connection, the search result information including N identifiers identifying N access points (N being an integer of 1 or greater) found by the search;

determine whether the first identifier exists in the N identifiers included in the search result information;

in a case where it is determined that the first identifier exists in the N identifiers, send a first connection instruction including the first identifier to the communication device via the wireless interface using the second wireless connection, the first connection instruction being for establishing a wireless connection between the communication device and the first access point identified by the first identifier; and in a case where it is determined that the first identifier does not exist in the N identifiers, send a second connection instruction including a second identifier different from the first identifier to the communication device via the wireless interface using the second wireless connection, the second connection instruction being for establishing a wireless connection between the communication device and a second access point identified by the second identifier.

2. The non-transitory computer-readable recording medium as in claim 1, wherein the computer-readable instructions, when executed by the processor, further cause the terminal device to:

in the case where it is determined that the first identifier exists in the N identifiers, cause a display unit of the terminal device to display a password input screen, wherein in a case where a first password for establishing the wireless connection between the communication device and the first access point is inputted to the password input screen, the first connection instruction including the first identifier and the first password is sent to the communication device.

3. The non-transitory computer-readable recording medium as in claim 1, wherein the computer-readable instructions, when executed by the processor, further cause the terminal device to:

in the case where it is determined that the first identifier does not exist in the N identifiers, cause a display unit of the terminal device to display a first identifier selection screen including the N identifiers, wherein in a case where one identifier is selected from the N identifiers on the first identifier selection screen, the second connection instruction including the second identifier which is the selected one identifier is sent to the communication device.

4. The non-transitory computer-readable recording medium as in claim 1, wherein the computer-readable instructions, when executed by the processor, further cause the terminal device to:

acquire M identifiers identifying M access points (M being an integer of 1 or greater) existing around the terminal device from the OS program; and in the case where it is determined that the first identifier does not exist in the N identifiers, cause a display unit of the terminal device to display a second identifier selection screen including the M identifiers, wherein in a case where one identifier is selected from the M identifiers on the second identifier selection screen, the second connection instruction including the second identifier which is the selected one identifier is sent to the communication device.

5. The non-transitory computer-readable recording medium as in claim 4, wherein in a case where it is determined that the first identifier does not exist in the N identifiers, and M1 identifiers (M1 being an integer of 1 or greater and M or less) and M2 identifiers (M2 being an integer of 1 or greater and M or less) exist in the M identifiers, the second identifier selection screen includes the M1 identifiers having a selectable manner and the M2 identifiers having a non-selectable manner, the M1 identifiers are identifiers included in the N identifiers, and the M2 identifiers are identifiers not included in the N identifiers.

6. The non-transitory computer-readable recording medium as in claim 1, wherein the first wireless connection between the terminal device and the first access point is disconnected after the first identifier has been acquired from the OS program, and the second wireless connection between the terminal device and the communication device is established after the first wireless connection has been disconnected, wherein the computer-readable instructions, when executed by the processor, further cause the terminal device to:

cause a display unit of the terminal device to display a first notification screen after the first connection instruction or the second connection instruction has been sent to the communication device, the first notification screen being for notifying that the first wireless connection between the terminal device and the first access point is to be re-established, wherein in a case where a predetermined operation is performed on the terminal device after the first notification screen has been displayed, the first wireless connection between the terminal device and the first access point is re-established.

7. The non-transitory computer-readable recording medium as in claim 1, wherein the first wireless connection between the terminal device and the first access point is disconnected after the first identifier has been acquired from the OS program, and the second wireless connection between the terminal device and the communication device is established after the first wireless connection has been disconnected, wherein the computer-readable instructions, when executed by the processor, further cause the terminal device to:

supply a re-establishment instruction to the OS program after the first connection instruction or the second connection instruction has been sent to the communication device, the re-establishment instruction being for re-establishing the first wireless connection between the terminal device and the first access point, wherein in a case where the re-establishment instruction is supplied to the OS program, the first wireless connection between the terminal device and the first access point is re-established.

8. The non-transitory computer-readable recording medium as in claim 1, wherein the computer-readable instructions, when executed by the processor, further cause the terminal device to:

determine whether communication via the first access point between the terminal device and the communication device is executable by sending a confirmation signal via the wireless interface using the first wireless connection after the first wireless connection between the terminal device and the first access point has been re-established; and in a case where it is determined that the communication via the first access point is inexecutable, cause a display unit of the terminal device to display a second notification screen for notifying that the communication via the first access point is inexecutable, wherein in a case where it is determined that the communication via the first access point is executable, the second notification screen is not displayed.

9. A communication device comprising:
a wireless interface configured to execute wireless communication according to Wi-Fi standard;
a processor; and
a memory storing computer-readable instructions therein,
wherein the computer-readable instructions, when executed by the processor, cause the communication device to:
after a first wireless connection has been established between a terminal device and a first access point identified by a first identifier, establish a second wireless connection between the terminal device and the communication device via the wireless interface;
in a case where the second wireless connection has been established, receive a search instruction from the terminal device via the wireless interface using the second wireless connection, the search instruction being for causing the communication device to execute a search for an access point existing around the communication device;
execute the search via the wireless interface in response to the search instruction having been received from the terminal device;
in a case where the search is executed, send search result information to the terminal device via the wireless interface using the second wireless connection, the search result information including N identifiers identifying N access points (N being an integer of 1 or greater) found by the search;
in a case where the first identifier exists in the N identifiers included the search result information, receive a first connection instruction including the first identifier from the terminal device via the wireless interface using the second wireless connection;
in a case where the first connection instruction is received from the terminal device, establish a wireless connection between the communication device and the first access point identified by the first identifier via the wireless interface;
in a case where the first identifier does not exist in the N identifiers included the search result information, receive a second connection instruction including a second identifier different from the first identifier from the terminal device via the wireless interface using the second wireless connection; and
in a case where the second connection instruction is received from the terminal device, establish a wireless connection between the communication device and a second access point identified by the second identifier via the wireless interface.

10. The communication device as in claim 9, wherein
the computer-readable instructions, when executed by the processor, further cause the communication device to:
in a case where a specific operation is performed on the communication device, shift a state of the communication device from a non-parent state to a parent state, the non-parent state being a state in which the communication device does not operate as a parent station of a wireless network, and the parent state being a state in which the communication device operates as the parent station,
wherein the second wireless connection is established between the terminal device and the communication device after the state of the communication device has been shifted to the parent state, and
the terminal device operates as a child station of the wireless network after the second wireless connection has been established.

11. The communication device as in claim 9, wherein
the computer-readable instructions, when executed by the processor, further cause the communication device to:
in a case where the first connection instruction or the second connection instruction is received from the terminal device, disconnect the second wireless connection between the terminal device and the communication device.

* * * * *